(No Model.)

H. L. HUBBARD.
HOOF PAD.

No. 378,887. Patented Mar. 6, 1888.

Witnesses:
K. C. Lannie
Van Buren Hillyard.

Inventor;
Horace L. Hubbard.
By R. S. & A. T. Lacey,
Attys

UNITED STATES PATENT OFFICE.

HORACE L. HUBBARD, OF CENTRE LISLE, NEW YORK.

HOOF-PAD.

SPECIFICATION forming part of Letters Patent No. 378,887, dated March 6, 1888.

Application filed September 19, 1887. Serial No. 250,089. (No model.)

*To all whom it may concern:*

Be it known that I, HORACE L. HUBBARD, a citizen of the United States, residing at Centre Lisle, in the county of Broome and State of New York, have invented certain new and useful Improvements in Hoof-Growing Pads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a pad for promoting the growth of horses' hoofs and to relieve fevered and sore hoofs.

The improvement consists, chiefly, of a roll of absorbent material for holding moisture, and a roll of chemical reagents for decomposing the moistening medium and liberating its constituent parts, which, combining with the hoof, assists its growth.

The improvement further consists in the novel features of construction, more fully hereinafter set forth and claimed, and shown in the annexed drawings, in which—

Figure 1:
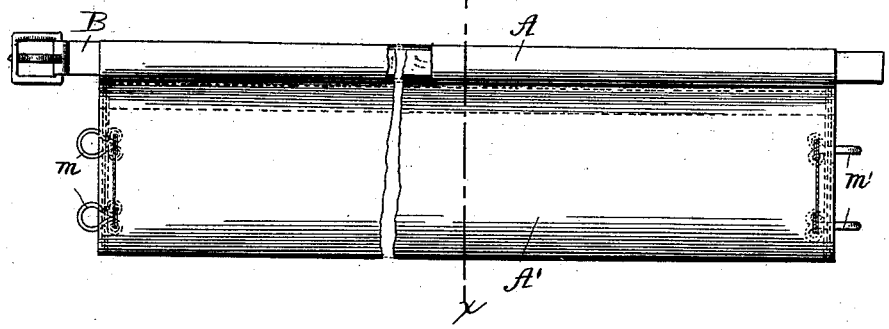
Figure 2:
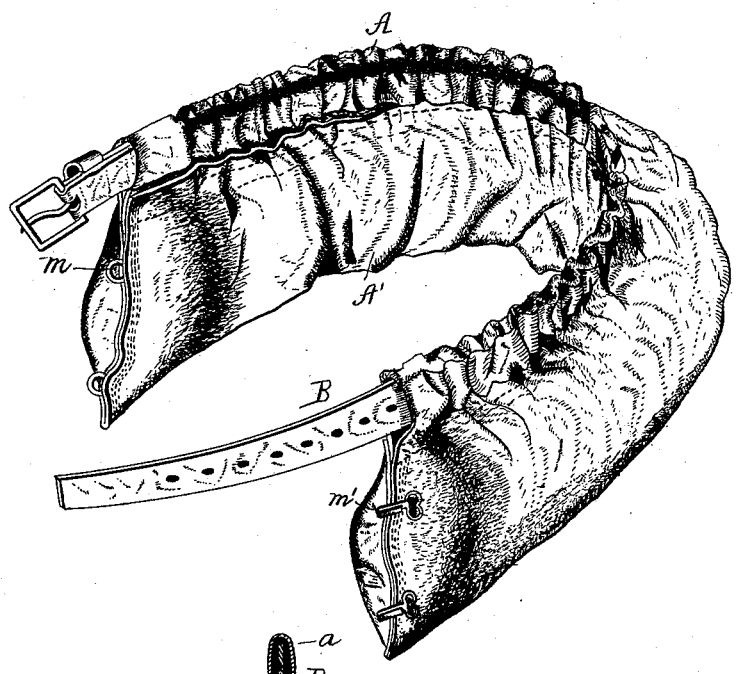
Figure 3:
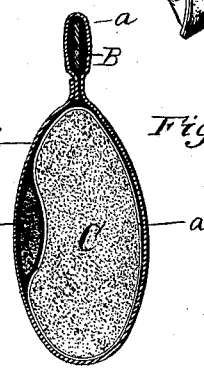

Figure 1 is a view, parts being broken away, of the pad spread out; Fig. 2, a perspective view of the pad ready for use, and Fig. 3 a cross-section on the line X X of Fig. 1.

The pad is composed of two strips, A and A', stitched together near their edges and near their top edge to form the pockets $a$ and $a'$, the draw-strap B, placed in the pocket $a$, the roll of absorbent material, C, and the roll of chemical reagents, D, arranged in the pocket $a'$. The strips may be composed of a single piece folded midway of its edges, or of two separate pieces placed upon each other, and are of a permeable material—at least the strip designed to come opposite the hoof—to permit the free passage of the moisture and liberated gases to the hoof. The chemical reagents found to give the best results, are metal filings, flakes or shavings of lead, iron, and zinc, mixed together about in equal parts. This mixture is placed in a small roll, which is secured to the inner side, A', of the pad, so as to come directly opposite the hoof. The roll of absorbent material, C, is placed over the roll D, and is composed, preferably, of sponge.

In practice the pad is immersed in water until the roll C is thoroughly saturated. Then it is buckled around the hoof by strap B, the lower corners being secured together in any manner, as by the hook and eye $m$ and $m'$ shown. The moisture penetrates the roll D, and is decomposed by the chemical action of the reagents. The moisture and the liberated gases attack the hoof and promote its growth.

Having thus described my invention, what I claim, and desire to secure by Letters Patent, is—

1. The combination, with the strips secured together near their edges and near their top edge to form two longitudinal pockets, of the draw-strap placed in the upper pocket and the chemical reagents, and the absorbent material for holding the moistening medium placed in the lower pocket, substantially as described.

2. The herein-described pad for the purpose specified, composed of the strips secured together to form an upper and a lower longitudinal pocket, the draw-strap placed in the upper pocket, the roll of chemical reagents, and the roll of absorbent material arranged in the lower pocket, the roll of reagents being secured to the inner strip, and the absorbent material being arranged over the roll of reagents, substantially as and for the purpose specified.

In testimony whereof I affix my signature in presence of two witnesses.

HORACE L. HUBBARD.

Witnesses:
W. J. HASKINS,
M. C. ALLEN.